United States Patent [19]

Ichikawa

[11] 3,996,503
[45] Dec. 7, 1976

[54] VARIABLE CAPACITOR

[75] Inventor: Sohji Ichikawa, Tokyo, Japan

[73] Assignee: Toko Incorporated, Tokyo, Japan

[22] Filed: June 17, 1975

[21] Appl. No.: 587,698

[30] Foreign Application Priority Data

June 18, 1974 Japan .............................. 49-70885
Oct. 4, 1974 Japan .......................... 49-120076
Oct. 4, 1974 Japan .......................... 49-120075

[52] U.S. Cl. .............................. 317/253; 317/254
[51] Int. Cl.² ........................................ H01G 5/06
[58] Field of Search .......................... 317/253, 254

[56] References Cited

UNITED STATES PATENTS

| | | | |
|---|---|---|---|
| 1,572,897 | 2/1926 | Marbury | 317/253 |
| 1,604,508 | 10/1926 | Zisch | 317/253 |
| 1,631,738 | 6/1927 | Koch | 317/253 |
| 1,680,702 | 8/1928 | Steiner | 317/253 |
| 3,262,033 | 7/1966 | Culbertson | 317/253 |

Primary Examiner—E. A. Goldberg
Attorney, Agent, or Firm—Sherman & Shalloway

[57] ABSTRACT

A variable capacitor includes a plurality of stator plates supported on spaced parallel rods. A plurality of rotor plates supported on a shaft are arranged so that each rotor plate is placed a predetermined distance from the surface of the adjacent stator plate. This is accomplished by spacer members disposed between the adjacent stator plates as well as between the adjacent rotor plates. Each spacer member is made of metal wire, with a circular cross-section, and is shaped in form of a ring. Use of the metal wire having a predetermined dimension is much more convenient than a tube or sleeve. Consequently fixing the distance between the stator plates and between the rotor plates can be performed with high accuracy.

1 Claim, 8 Drawing Figures

VARIABLE CAPACITOR

BACKGROUND OF THE INVENTION

1. Field of the Invention

This invention relates to a variable capacitor of the type in which the capacitance is varied with the rotation of a shaft.

2. Technical Considerations and Prior Art

A typical variable capacitor comprises alternately disposed stator plates and rotor plates between which a dielectric is positioned.

In such variable capacitors, it is important that the distance between each stator plate and the rotor plate facing it is accurately fixed to obtain the predetermined capacitance characteristics. Consequently the instances between the adjacent stator plate as well as the adjacent rotor plates must be accurately held at the predetermined value. This is done by a spacer member, such as a washer which is disposed therebetween. However, washers, when punched out of a metal sheet have errors which range between plus and minus 0.01 percent in thickness from the desired value. Moreover, burrs, formed during the punch-out process, occur on the inner and outer edges.

In the conventional variable capacitors, the rotor plates are made of a comparatively soft and easy-to-fabricate material, such as aluminum, and are provided with a number of slits. These slits permit deformation, or bending, of the rotor to adjust the capacitance of a particular section at a given rotational angle.

Adjustments made in this manner are tedious and time consuming, moreover, the plates thus deformed are liable to return to the original shape with the lapse of time thereby changing the capacitance characteristics.

Accordingly, when the punched-out type washers are used, they must be lapped to the predetermined thickness. This results not only with increased manufacturing cost but also in a loss in yield caused by "over-lapping" to thinner thicknesses than required.

SUMMARY OF THE INVENTION

It is a primary object of this invention to provide a variable capacitor which has predetermined capacitance characteristics which are obtained without the necessity of complicated rotor plate adjustments.

Another object of this invention is to provide a variable capacitor which maintains the original capacitance characteristics over substantially the whole lifetime thereof.

Furthermore, it is an object of this invention to provide a variable capacitor which does not require capacitance tests during or after the assembly operation, thereby reducing the manufacturing cost.

According to this invention, there is provided a variable capacitor which comprises a plurality of stator plates attached to a frame structure, a plurality of rotor plates supported on a rotating shaft, the startor and rotor plates being placed in an alternating order with predetermined spacing. Ring-type spacer members provided, each of which is made of round wire and is disposed between the adjacent stator plates and between the adjacent rotor plates.

Since it is possible to restrict the diameter of a metal wire within narrow limits (order of microns), a ring-type spacer made with such wire can have an accurate thickness with respect to the desired value when compared with washers punched out of a metal sheet.

Accordingly, in this invention, use of ring-type spacers with the desired thickness in a variable capacitor will result in constant and predetermined capacitance characteristics owing to accurate placement of the stator and rotor plates.

Furthermore, in this invention, use of rotor plates made with harder material than heretofore combined with a novel scheme for tightening a nut in the rotor assembly on the rotating shaft, results in manufacturing savings, because a variable capacitor requiring no additional adjustments is provided.

Other objects and features of this invention will be more fully understood from the following detailed description with reference to the accompanying drawings, in which:

IN THE DRAWINGS

DESCRIPTION OF THE PREFERRED EMBODIMENTS

Figure 1:
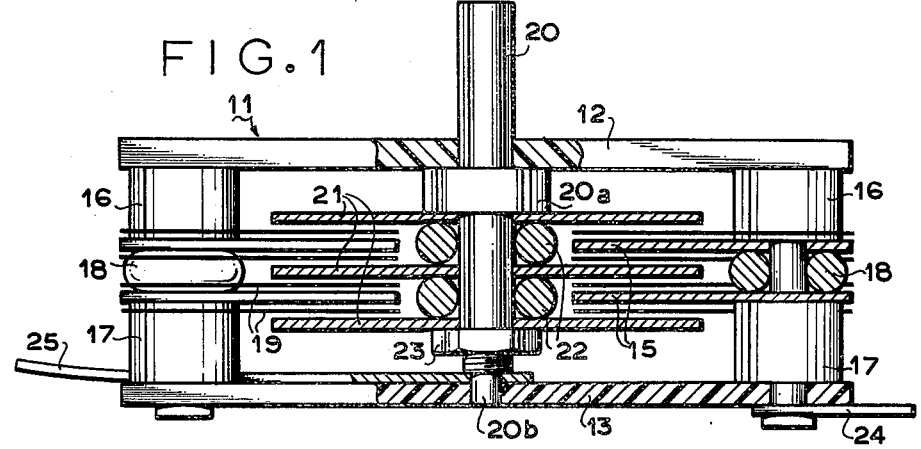
FIG. 1 is a side elevation, partly cut away, of a variable capacitor embodying this invention.

Referring now to the accompanying drawings, more particularly to FIG. 1, the reference numeral 11 denotes the frame structure which comprises a substrate 12 formed of, for example, a plastic material, a backing plate 13 disposed in parallel to the substrate 12 and connecting rods 14 which attach the plate 13 to the substrate.

In the frame structure 11 there are placed a pair of stator plates 15 which are arranged in parallel with each other. Each of the connecting rods 14 supports a pair of sleeve members 16 and 17, and a spacer member 18 for holding the stator plates 15 in such a manner that one of the stator plates is on top of each spacer 18 and one is below each spacer 18. In case of variable capacitors which are small in size, suitable dielectric members, such as polyethylene films 19 are arranged adjacent to both surfaces of each stator plate 15.

Figure 3A:
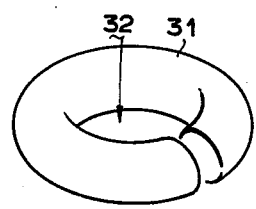
FIGS. 3A to 3D are perspective views of various spacer members, respectively.

The spacer member 18 shown in FIG. 3A, may be a ring which is formed by bending a length of round metal wire, preferably brass, phosphor-bronze, stainless steel, or piano-wire, in a coiling machine so as to form a central bore 32 through which the rod 14 penetrates. During the wire cutting operation, the cutter stroke is directed towards the center of the bore. This method prevents burrs, such as the burrs 33 in FIG. 3B, produced during the cutting from affecting the wire thickness.

In the frame structure 11 a shaft 20 is rotatably supported. The shaft has a flange 20a and an engaging portion 20b. The distance between the flange and engaging portion is selected at a value slightly larger than the distance between the substrate 12 and backing plate 13 so that the shaft 20 is axially biased to be pressed against the inner surface of the substrate 12 at the flange 20a by the resiliency of the backing plate 13 to restrict the axial movement of the shaft.

A plurality of rotor plates 21 (three in this embodiment) are arranged in parallel with each other with the distance substantially equal to that between the stator plates 15. The rotor plates 21 are held in position by means of spacer members 22 disposed therebetween. The assembly of the rotor plates 21 and spacer members 22 is supported on the shaft 20 by pressure between the flange 20a and a nut 23 fastened to the shaft 20 at a predetermined position in which an alternating arrangement of the rotor and stator plates is formed. The spacer members 22 have the same structure as the spacer member 18 and uses the same material. The reference numerals 24 and 25 respectively depict terminals, the former being connected to the stator plates 15 through rod 14 and the latter to the rotor plates 21 through the shaft 20.

The simplified structure of the variable capacitor, in the present invention, illustrated in FIG. 1 shows only a few of the stator and rotor plates. In practice, however, the number of respective plates may be 15 or more, depending on the desired maximum capacitance. Thus, it is evident that high accuracy is required in the thickness of the spacer members, especially when a large number of plates are assembled in the structure.

As has been previously stated, the metal wire used in each of the spacer member 18 and 22 are highly precise in comparison with washers of the punched-out type. The reason is that the accuracy in the wire diameter can be maintained within ± 1 micron during the drawing operation. Such accuracy is not readily achieved in the punchingout process.

Figure 2:
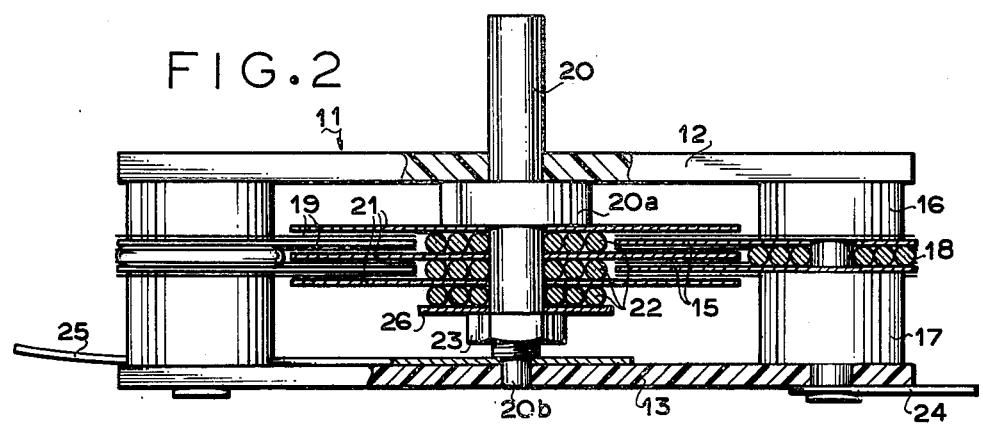
FIG. 2 is a side elevation, partly cut away, of another variable capacitor embodying this invention.
Figure 3C:
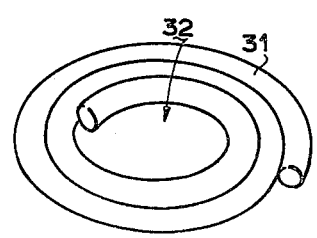
Figure 3B:
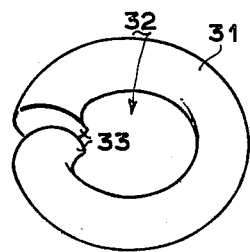

FIG. 2 illustrates another embodiment of the present invention in which each spacer member 181 and 221 is a spiral coil 31 consisting of a few turns of the round metal wire as shown in FIG. 3C.

In FIG. 2, the same or similar parts in FIG. 1 are shown by the same reference numerals and the description thereof is omitted. The spacer members of the spiral form have an advantage over that of the single ring type in that the stator plates and rotor plates are held in the desired plane owing to the increase in the number of effective contacting points between the spacer members and respective plates.

Figure 3D:
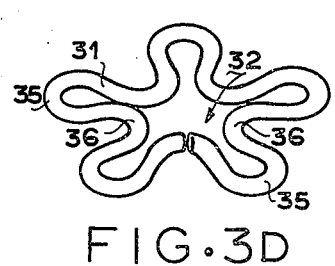

The spacer member may be of the form shown in FIG. 3D which is characterized by a plurality (five shown) of inwardly and outwardly curved portions 35 and 36, a central bore 32 being formed inside the innermost end of the portion 36.

In the two embodiments of the present invention as described, a fastening nut is used to fix the rotor plates and spacer members into the rotor shaft. In conventional variable capacitors, aluminum is used for the rotor plates. Consequently, when the nut is tightened on the shaft, there will be deformation of the plates and the accuracy of the spacer members will not be effectively maintained.

In order to prevent deformation in the present invention, it is preferred the rotor plate is selected from a material more rigid than aluminum, for example, brass, phosphor-bronze, stainless steel or the like.

Figure 4A:
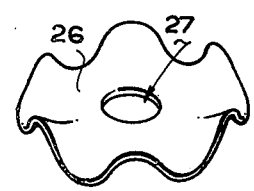
FIG. 4A is a perspective view of the buffer washer used to cushion the rotor shaft.

Again, in the present invention, as shown in FIG. 2, a washer 26 is disposed between the tightening nut 23 and the rotor plate closest to this nut. The washer is made of material, such as zinc, tin, lead, or alloys thereof. Alternatively, a plastic resin may be used, which is more easily deformed compared with the material used for the rotor plates and space members. In this manner, the washer 26 will absorb any tendency to deform before the rotor plates have a chance to deform and therefore aids in maintaining the accuracy of the distance between the rotor plates and eliminates changes in capacitance characteristics. Furthermore, when the configuration of this washer is as shown by the washer 37 in FIG. 4A, the facing surface of the nut need not be exactly in parallel with the rotor plates, the reason being that the flared portions in the washer will equalize the pressure on the rotor plates.

Figure 4B:
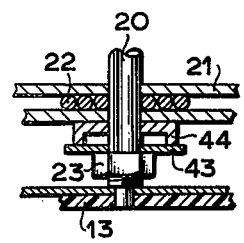
FIG. 4B is a cross section of part of another variable capacitor having a modified cushioning washer.

Furthermore, another practical system of equalizing the tightening pressure on the rotor plates is shown in FIG. 4B. Two metal washers are used, one being a conventional flat washer 43 and the other in form of a flat cup 44 with both sides ground flat and with a center hole for the rotor shaft. The outer diameter of both parts are made larger than that of the tightening nut in outer dimensions. The inner diameter of the cup washer is also made larger than the nut so that when the nut is tightened, the flat washer 43 will flex and absorb the pressure without causing deformation of the rotor plates. It is desirable that the cup washer 44 be made of the same material as the spacer member.

This invention is not limited to the particular embodiments thereof illustrated and described herein without leaving from the scope of this invention.

What is claimed is:
1. A variable capacitor comprising:
a frame structure including a substrate and backing plate arranged parallel with one another and connected together in spaced relation by a plurality of rods;
a shaft rotatably supported in said frame and axially urged toward said substrate by the resiliency of said backing plate;
a plurality of stator plates disposed in said frame member and arranged parallel to one another;
a plurality of rotor plates fixed to said shaft and arranged in parallel spaced relation to one another;
first spacer means disposed around said shaft and between said rotor plates to retain said rotor plates in spaced relation, wherein said first spacer means are annular spiral members having a plurality of turns and formed of wire with a circular cross-section, and wherein each spacer means separates the rotor plates by a distance equal to one diameter of the wire;
second spacer means disposed around each of said rods and between said stator plates to retain said stator plates in spaced relation, wherein said second spacer means are annular spiral members having a plurality of turns and formed of wire with a circular cross-section, and wherein each spacer means separates the rotor plates by a distance equal to one diameter of the wire;
a nut threaded on said shaft between said backing plate and the adjacent rotor plate;
a flat washer disposed on said shaft adjacent to said nut; and
a cup-shaped washer having an open side and a closed side, wherein the closed side abuts the rotor plate and the open side abuts the flat washer, and wherein the open side defines an opening having an area larger than the area defined by said nut, so that when the nut is tightened the flat washer deforms into the opening thereby negating deformation of the rotor plates.

* * * * *